United States Patent [19]

Bohan, Jr.

[11] 4,373,201

[45] Feb. 8, 1983

[54] FAIL SAFE DIGITAL TIMER

[75] Inventor: John E. Bohan, Jr., Minneapolis, Minn.

[73] Assignee: Honeywell Inc., Minneapolis, Minn.

[21] Appl. No.: 210,967

[22] Filed: Nov. 28, 1980

[51] Int. Cl.³ .............................................. G06F 11/16
[52] U.S. Cl. ........................................ 371/68; 371/58; 371/14; 377/29
[58] Field of Search .............................. 371/68, 58, 14; 235/92 EC

[56] References Cited

U.S. PATENT DOCUMENTS

| | | | |
|---|---|---|---|
| 3,155,939 | 11/1964 | Vadus | 371/68 |
| 3,618,015 | 11/1971 | Homonick | 371/5 |
| 3,845,282 | 10/1974 | Mattson | 235/92 EA |
| 3,898,444 | 8/1975 | Cordi et al. | 371/68 |
| 4,096,396 | 6/1978 | Belforte et al. | 371/68 X |
| 4,255,809 | 3/1981 | Hillman | 371/58 |

*Primary Examiner*—David H. Malzahn
*Attorney, Agent, or Firm*—Alfred N. Feldman

[57] ABSTRACT

A fail safe digital timer is provided by having a pair of similar counters counting the output of a single clock means. The clock means provides clock pulses and complimentary clock pulses to the two counters and the outputs of the counters are compared. If the two counters are properly operating the comparison will provide a continuous stream of pulses at a frequency equal to the frequency of the clock means for the timer. The failure of any of the components in the system cause the output of the comparator means to either become a constant logic 1 or a constant logic 0.

10 Claims, 2 Drawing Figures

FAIL SAFE DIGITAL TIMER

BACKGROUND OF THE INVENTION

Digital timers have been used extensively with all types of systems and devices ranging from household appliances to large size computing systems. Digital timers typically operate from a clock means driven directly by the line voltage, or can be operated from crystal controlled oscillators that are widely used in devices such as microprocessor controlled equipment. Most of the equipment that utilize digital timers do not involve safety functions, or are large enough to provide backup timers to insure proper operation. In certain types of control equipment, the redundant use of timers or backup timers can not be tolerated from a cost point of view. Certain types of this equipment, however, must be operated in a fail safe manner because of the nature of the equipment. This is particularly true of burner control equipment for programming the operation of burners that supply heat to boilers or furnaces. The failure of the timer in this type of equipment can lead to a catastrophic type of failure or explosion that has the potential of not only monetary damage, but the possible loss of life.

Most of the equipment used for timing in burner control equipment in the past has relied on a motor driven mechanism utilizing a small clock type timer that has proven to be reliable through many years of use. The clock type timer normally drives a series of cams which operate switches at appropriate time intervals so that the program contained within the burner equipment will function as programmed. This type of equipment is being rapidly replaced by digital equipment, and particularly digital equipment that includes a microprocessor for executing the control program. The operation of this new type of equipment relies on a digital timer and the failure of the digital timer clearly would create a potential failure of an unsafe nature.

SUMMARY OF THE INVENTION

The present invention is directed to a fail safe type of digital timer that relies on a digital clock. The digital clock can be driven by any type of cyclic source, such as the line potential or a crystal oscillator. The invention relies on sensing two outputs from the digital clock and inverting one of the outputs. The two outputs are fed to two similar counters and the outputs from the two counters are compared. If the counters are properly operating, the comparator will have a continuous output that is pulsed in nature. If either of the counters or any of the circuitry prior to the counters becomes defective, the comparator will not be able to provide the continuous series of pulses that occur during normal operation. The comparator has an output that is either constantly high or constantly low and this information is used to safely control a load means. The combination of the comparator output and a counter output is capable of being used to drive control equipment or other types of equipment where a fail safe type of timer is necessary.

DESCRIPTION OF THE PREFERRED EMBODIMENT

Figure 1:
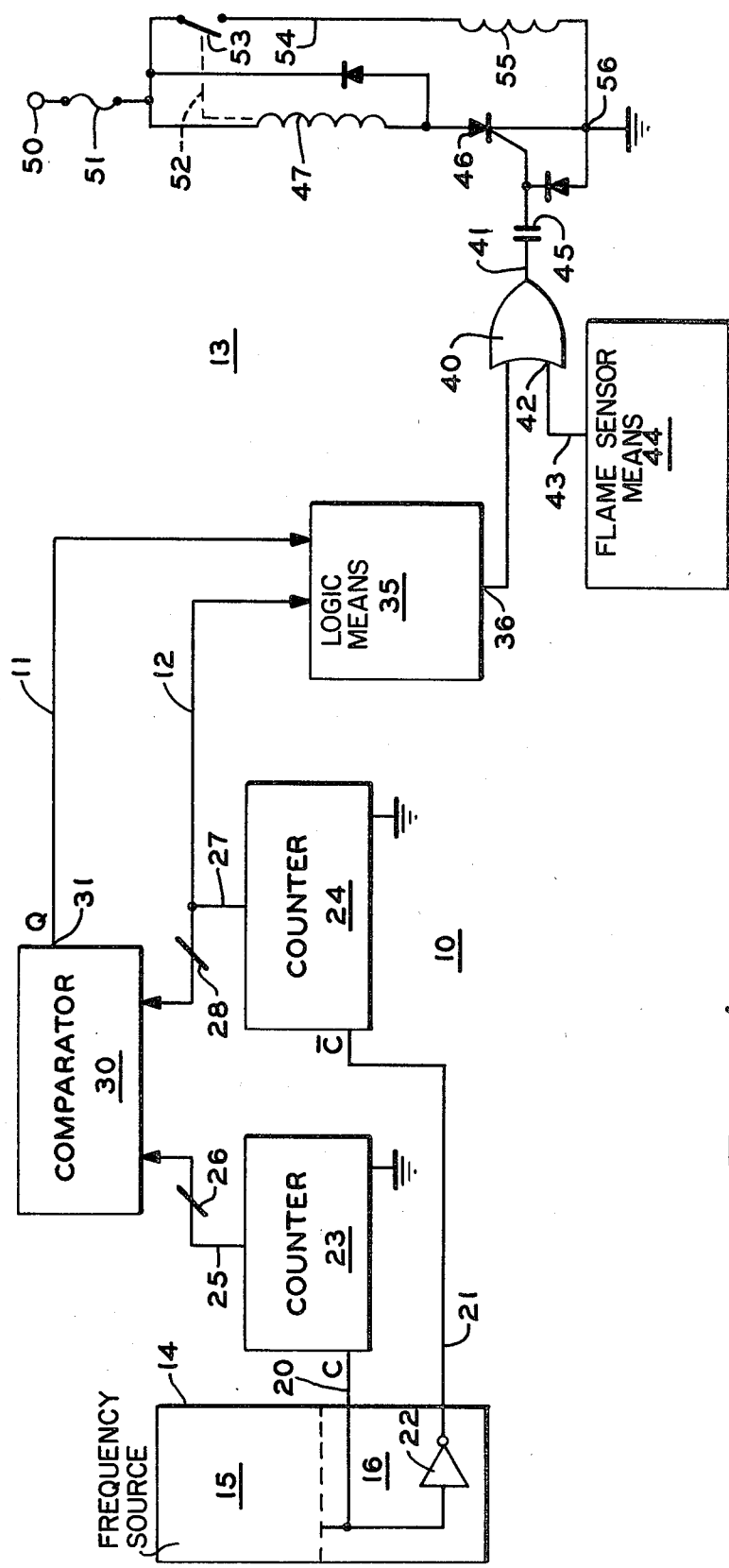
FIG. 1 is a diagram of a simple burner control system utilizing the invention.

In FIG. 1 there is disclosed a complete system showing the incorporation of the invention of a fail safe timer in a burner control or flame safeguard type of system. The fail safe digital timer 10 is shown connected by a pair of conductors 11 and 12 to a portion of the circuit that has been designated as the load means 13. The load means 13 is part of a flame safeguard system to show the application of the fail safe timer means 10 in a typical system.

The fail safe timer 10 includes a clock means 14 that includes two portions 15 and 16. The portion 15 is a continuously running frequency such as the conventional 60 hertz line frequency or could be any other type of frequency such as a crystal controlled oscillator. The other portion of the clock means 14 is an output means portion providing a clock pulse on conductor 20 and a complimentary clock pulse on conductor 21. The complimentary clock pulse is generated by connecting the clock pulse on conductor 20 through a conventional NOT gate 22 thereby inverting the clock pulse.

The clock pulses on conductor 20 are connected to a first counter means 23, while the complimentary clock pulses on conductor 21 are connected to a second counter means 24. It should be understood that the terms first counter means and second counter means are interchangeable, and if this interchange is made then the clock pulses and complimentary clock pulses would be interchanged also. The counter means 23 and 24 typically would be binary counters of conventional design having the number of bits that is compatible with the time interval for which the fail safe digital timer 10 is to be provided. The counter means 23 has an output at 25 that has been shown as a single line with the notation at 26 indicating that the line really is a group of conductors that is compatible with the number of bits of the binary counter means 23. This same notation is disclosed in connection with the counter means 24 where an output conductor or output means 27 is disclosed again with the notation at 28 indicating that the output means 27 has a number of conductors compatible with the counter means 24. The two output means 25 and 27 are connected to a comparator means generally disclosed at 30 which compares the binary outputs or codes from the two counter means 23 and 24. The comparator means 30 has an output means 31 that has been identified as the Q output and this is connected to the conductor 11.

The operation of the fail safe digital timer 10 will now be discussed before the balance of the circuit is described. The clock means 14 provides a continuous running source of clock pulses on conductor 20 and complimentary clock pulses on conductor 21. The two binary counter means 23 and 24 each receive their counts from the clock pulses and the complimentary clock pulses and each of the counters will count up together having an output on the output means 25 and 27. The output means 25 and 27 will each have similar output counts, but counts that are displaced in time because of the nature of the clock pulses and the complimentary clock pulses being fed to the two binary counter means 23 and 24. The comparator means 30 compares the similar but displaced output means 25 and 27, and if the two counts are present in the proper form, the comparator means 30 will have an output Q at 31 which is a repetitive output signal. The repetitive output signal will be a series of pulses at a frequency equal to the frequency of the output of the clock means 14.

In the event that there is a component or functional failure in the counter means 23, the counter means 24, or the comparator means 30, the continuous series of pulses Q on conductor 11 will change to a constant output at either a high or low level, or will be at a frequency different than the frequency of the clock means 14. The load means 13 is responsive to the appropriate series of pulses or counts on conductor 11 and therefore any failure in the timer means 10 would cause the output means 13 to become deenergized which is a safe condition. The manner in which this is accomplished will be described in connection with a consideration of the output pulses or signals that are present on conductors 11 and 12 to the load means 13.

The conductors 11 and 12 are connected to a logic means 35 that is responsive only to a specific time interval from the fail safe digital timer 10. The manner in which this is accomplished will be discussed in connection with FIG. 2. The logic means 35 must receive a continuous series of pulses on conductor 11 along with the output means 27 of the second counter 24. As long as a series of properly generated repetitive output signal pulses occur on the conductor 11, the logic means 35 responds to the output of a second counter means 24 on conductor 12. When the logic means 35 senses the presence of the proper repetitive output signal on conductor 11, and the proper count on the conductor 12, the logic means 35 has an output on a conductor 36 that shifts from a logic 0 to a continuous series of logic 1s. The output 36 is connected to an OR gate 40 that has an output at 41 and a further input at 42. The input 42 is connected by conductor 43 to a flame sensor means 44 which can be any type of flame detecting apparatus that has a pulsed output when flame is sensed, and where the pulsed output is at a frequency corresponding to the frequency of the clock means 14. The flame sensor means 44 has a logic 0 on conductor 43 when no flame is present and a continuous series of logic 1s on conductor 43 when flame is present.

The OR gate 40 supplies a pulse through a capacitor 45 to a silicon controlled rectifier 46 that is connected in series with a relay coil 47 to a fuse 51 and a source of power 50. The relay coil 47 is connected at 52 to a contact 53 which can complete a circuit to the conductor 54 and a fuel valve 55. The operation of the relay 47, whenever the silicon controlled rectifier 46 is gated into conduction, closes the switch 53 and supplies power on the conductor 54 to the fuel valve 55 from the power source 50 to a common ground 56. Since the comparator means 30 puts out a repetitive series of pulses during correct operation, the output 41 of the OR gate 40 is a series of pulses when a series of pulses is supplied on conductor 36 or on the conductor 43. These logic pulses gate the silicon controlled rectifier 46 each time a positive potential is applied on the source 50 thereby effectively keeping the relay 47 energized whenever a pulse is supplied to either of the inputs of the OR gate 40. This pulse train is coupled through the isolating capacitor 45 to effectively keep the fuel valve means 55 energized as long as the timer means 10 supplies a count to the logic means 35 that indicates that it is a proper time for the fuel valve 56 to be open, or whenever the flame sensor means 44 senses the existence of a flame. The application of this system, in one particular operating mode, will be discussed in connection with FIG. 2.

Figure 2:
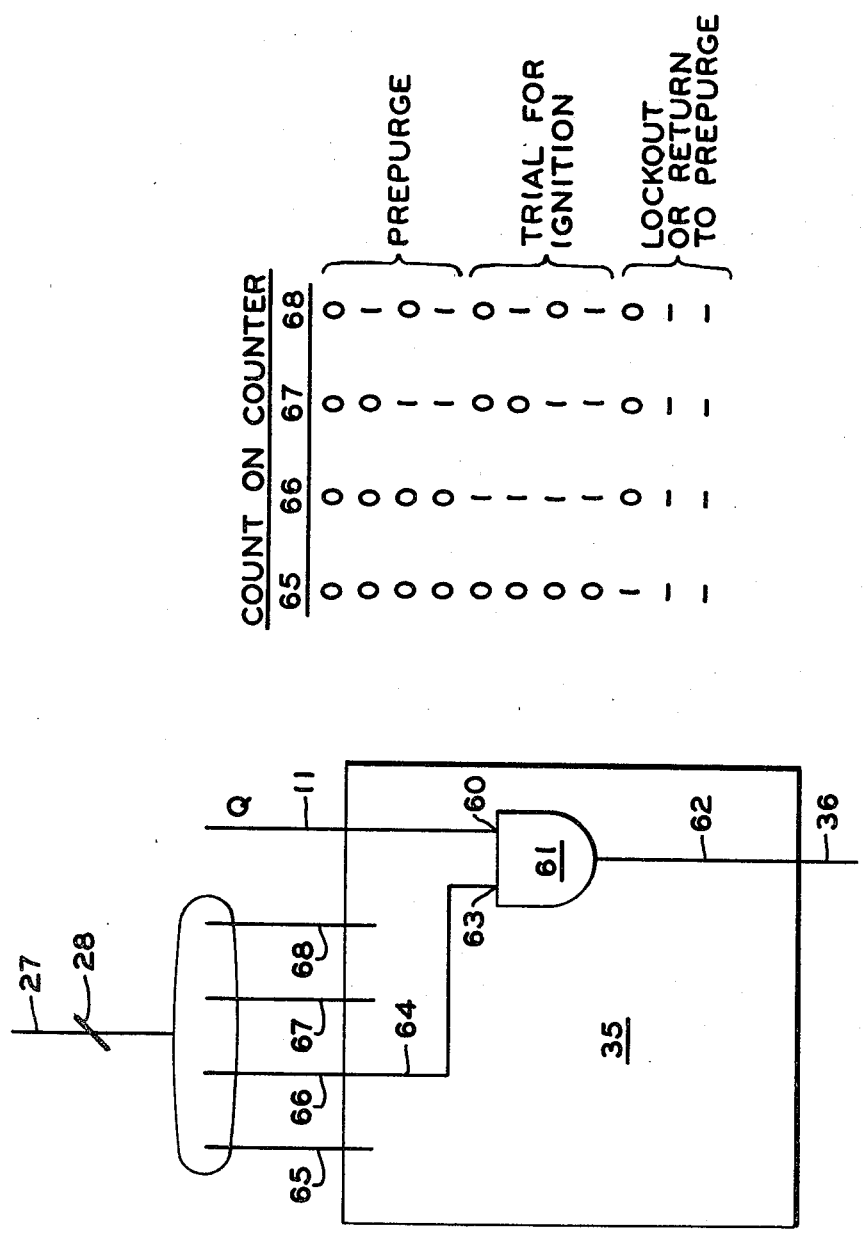
FIG. 2 is a disclosure of the content of block 35 of FIG. 1.

In FIG. 2 the logic means 35 has been shown in more detail. The conductor 11 which supplies the Q pulse or the repetitive output signal from the comparator means 30 is again shown as being connected at 60 to an AND gate 61 that has an output conductor 62. The AND gate 61 further has an input 63 that is connected by a conductor 64 to a conductor designated as conductor 66 or the third conductor of the multiple conductors being supplied from the second counter means 24. The other conductors shown are conductors 65, 67, and 68. These conductors are not shown connected to any logic within the logic means 35 as they provide a different timing function than the specific timing function that will be illustrated in connection with FIG. 2. In connection with the description of FIG. 2, a truth table or logic table for the counts on the counter are disclosed for a timing function for the trial for ignition portion of a fuel burner system. The trial for ignition portion of such a fuel burner system is the time when fuel and ignition are supplied to the burner means for a set period of time in which the burner means tries to ignite the output of fuel and properly sense the flame by means of the flame sensor means 44. If a successful trial for ignition occurs, flame is established and the flame sensor means 44 functions after the set time interval to keep the fuel means 55 energized. This means that the output of the flame sensor means 44 would be a continuous series of logic 1s on the conductor 43. In order to provide the time interval for the trial for ignition, the digital count on the conductor 66 at input 63 of the AND gate 61 must be a digital 1. This is shown in the second column of truth table shown in FIG. 2.

In operation, when the fail safe timer 10 reaches the count where the trial for ignition should occur, the count from the counter means 24 on the group of conductors or output means 27 has a logic 1 on the conductor 66 thereby providing a continuous series of logic 1s at the output conductor 62 of the AND gate 61. It will be noted from the table in FIG. 2 that a logic 1 is present at the terminal 63 of the AND gate 61 only during the trial for ignition portion of the timing cycle. This will allow the output means 36 of the logic means 35 to supply a continuous series of logic 1s to the OR gate 40 in FIG. 1 thereby causing the fuel means 55 to be opened for the trial for ignition period. If flame is established during this trial for ignition portion of the time, the flame sensor means 44 senses this event. The flame sensor means 44 then provides a continuous series of logic 1s on conductor 43 to the OR gate 40 so that when the trial for ignition time period ends, the fuel valve 55 is kept open under the control of the flame sensor means 44.

The logic means 35 of FIG. 2 is a highly simplified disclosure of a typical timing function. It is quite obvious that the digital logic contained in the logic means 35 can be designed for any type of programmed logic for the load means 13. The key element is that the timer for the operation of the load means is a fail safe digital type of timer that has an output that is repetitive at a proper frequency only if all of the components within the timer structure are operating properly.

The invention of the present disclosure has been described in connection with the application of the fail safe digital timer to a burner control system as the load means and has shown one highly simplified form of logic means for combining the fail safe timer into such a system. There are many modifications in the digital logic possible and these are obvious to any person familiar with digital design. Since the configuration of the digital logic can be altered conveniently by anyone familiar with the digital art, the applicant wishes to be limited in the scope of his invention solely by the scope of the appended claims.

The embodiments of the invention in which an exclusive property or right is claimed are defined as follows:

1. A fail safe digital timer, including: clock means having output means providing clock pulses and complimentary clock pulses; first counter means connected to said clock output means to receive said clock pulses with said first counter means having output means to provide first counter codes; second counter means connected to said clock output means to receive said complimentary clock pulses with said second counter means having output means to provide second counter codes; comparator means connected to the output means of said counter means to compare said first and said second counter codes; said comparator means having a repetitive output signal upon both said counter means successfully counting the clock pulses and the complimentary clock pulses; said repetitive output signal ceasing upon the failure of the proper outputs being present from said clock means, said counter means, and said comparator means; and load means connected to said repetitive output signal and the counter codes from said second counting means; said load means being responsive to the presence or absence of said repetitive output signal from said comparator means along with the counter codes from said second counter means.

2. A fail safe digital timer as disclosed in claim 1 wherein said clock pulses and said complimentary clock pulses are digital logic pulses.

3. A fail safe digital timer as disclosed in claim 2 wherein said first and said second counter means are similar binary counters; and said first and said second counter codes are digital logic codes.

4. A fail safe digital timer as disclosed in claim 3 wherein said comparator means repetitive output signal is a continuous series of pulses equal in frequency to the frequency of said clock pulses when said digital timer is functioning properly.

5. A fail safe digital timer as disclosed in claim 4 wherein said clock means includes a NOT gate in said clock output means to provide the complimentary digital clock pulses; and a signal source included in said clock means.

6. A fail safe digital timer as disclosed in claim 4 wherein said load means includes logic means responsive to the counter pulses from said second counter means to establish a time of operation of said load means.

7. A fail safe digital timer as disclosed in claim 6 wherein said load means further includes flame responsive sensor means having a digital logic output which is compared with an output from said logic means with the resultant compared outputs connected to operate said load means; and fuel control means controlled by said resultant compared outputs.

8. A fail safe digital timer as disclosed in claim 7 wherein said load means includes an OR gate to combine the flame sensor digital logic output and the logic means output to control said fuel control means.

9. A fail safe digital timer as disclosed in claim 8 wherein said fuel control means includes solid state switch means to energize electromagnetically operated fuel control means.

10. A fail safe digital timer as disclosed in claim 9 wherein said solid state switch means is a silicon controlled rectifier and said said electromagnetically operated fuel control means includes a relay.

* * * * *